US010995392B2

(12) United States Patent
Manuel et al.

(10) Patent No.: US 10,995,392 B2
(45) Date of Patent: May 4, 2021

(54) RADIATION SHIELDING AND MITIGATING ALLOYS, METHODS OF MANUFACTURE THEREOF AND ARTICLES COMPRISING THE SAME

(71) Applicant: University of Florida Research Foundation, Inc., Gainesville, FL (US)

(72) Inventors: Michele Viola Manuel, Gainesville, FL (US); Hunter B. Henderson, Knoxville, TN (US); Kelly A. Jordan, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 16/852,995

(22) Filed: Apr. 20, 2020

(65) Prior Publication Data
US 2020/0263278 A1     Aug. 20, 2020

Related U.S. Application Data

(60) Division of application No. 15/654,817, filed on Jul. 20, 2017, now Pat. No. 10,662,508, which is a continuation-in-part of application No. PCT/US2016/013784, filed on Jan. 18, 2016.

(60) Provisional application No. 62/106,975, filed on Jan. 23, 2015.

(51) Int. Cl.
| C22C 23/06 | (2006.01) |
| B32B 15/01 | (2006.01) |
| B32B 15/00 | (2006.01) |
| C22C 23/00 | (2006.01) |
| C22C 23/02 | (2006.01) |

(52) U.S. Cl.
CPC .............. *C22C 23/06* (2013.01); *B32B 15/00* (2013.01); *B32B 15/01* (2013.01); *C22C 23/00* (2013.01); *C22C 23/02* (2013.01); *B32B 2250/42* (2013.01); *B32B 2605/18* (2013.01)

(58) Field of Classification Search
None
See application file for complete search history.

(56) References Cited

U.S. PATENT DOCUMENTS

| 2,380,200 | A | 7/1945 | Stroup |
| 5,015,863 | A | 5/1991 | Takeshima et al. |
| 5,156,806 | A | 10/1992 | Sutula |
| 5,925,313 | A | 7/1999 | Kajihara |
| 6,896,517 | B1 | 5/2005 | Bjoern |
| 7,771,774 | B2 | 8/2010 | Berckmans et al. |
| 2003/0087197 | A1 | 5/2003 | Schulman et al. |
| 2004/0045639 | A1* | 3/2004 | Kikawa .................. C22C 23/00 148/420 |
| 2004/0241314 | A1 | 12/2004 | Li |
| 2005/0079200 | A1 | 4/2005 | Rathenow et al. |
| 2005/0250073 | A1 | 11/2005 | Tresser et al. |
| 2005/0266041 | A1 | 12/2005 | Gerold et al. |
| 2006/0198869 | A1 | 9/2006 | Furst et al. |
| 2007/0169859 | A1* | 7/2007 | Kawamura ............. C22C 23/06 148/667 |
| 2007/0169869 | A1 | 7/2007 | Kawamura |
| 2008/0075624 | A1 | 3/2008 | Sakai |
| 2008/0152532 | A1 | 6/2008 | Nakata |
| 2008/0243242 | A1 | 10/2008 | Kappelt et al. |
| 2008/0312736 | A1 | 12/2008 | Mueller et al. |
| 2009/0081313 | A1 | 3/2009 | Aghion |
| 2009/0131540 | A1 | 5/2009 | Hiromoto et al. |
| 2009/0171452 | A1 | 7/2009 | Yamamoto |
| 2009/0175754 | A1 | 7/2009 | Wilks |
| 2009/0226857 | A1 | 9/2009 | Grant et al. |
| 2010/0075162 | A1 | 3/2010 | Yang et al. |
| 2010/0161031 | A1 | 6/2010 | Papirov et al. |
| 2010/0206438 | A1* | 8/2010 | Nakata ..................... C22F 1/06 148/501 |
| 2010/0310409 | A1 | 12/2010 | Gibson |
| 2011/0054629 | A1 | 3/2011 | Seok et al. |
| 2011/0070120 | A1 | 3/2011 | Kim |
| 2011/0076319 | A1 | 3/2011 | Orlowski et al. |
| 2011/0319986 | A1 | 12/2011 | Bayer et al. |
| 2012/0148871 | A1 | 6/2012 | Stormer |
| 2013/0144290 | A1 | 6/2013 | Schiffl |
| 2013/0199677 | A1 | 8/2013 | Venkatesan et al. |
| 2014/0248288 | A1 | 9/2014 | Kumta |
| 2014/0373982 | A1 | 12/2014 | Chen |

FOREIGN PATENT DOCUMENTS

| CN | 102260812 | 11/2011 | |
| DE | 19905702 | 5/2000 | |
| EP | 0258177 A1 * | 3/1988 | ............... G21F 1/02 |
| EP | 0261470 | 3/1988 | |
| EP | 0263274 | 4/1988 | |
| EP | 1842507 A1 * | 10/2007 | ............. A61L 27/34 |

(Continued)

OTHER PUBLICATIONS

Hort et al. (Magnesium alloys as implant materials—Principles of property design for Mg—Re alloys), Acata Biomaterialia, 2009, pp. 1714-1725 (Year: 2009).*
Machine translation of JPH08276117A (translated Dec. 16, 2020 Espacenet.com) (Year: 1996).*
Machine translation of EP0258177A1 (translated Dec. 16, 2020 patents.google.com) (Year: 1988).*
Livescience.com, Facts about Zinc, {Http://https://www.livescience.com/29378-zinc.html} (accessed Jan. 20, 2021),(2015), pp. 1-6. (Year: 2015).*

(Continued)

*Primary Examiner* — David Sample
*Assistant Examiner* — Elizabeth Collister
(74) *Attorney, Agent, or Firm* — Thomas|Horstemeyer, LLP

(57) ABSTRACT

Embodiments of the present disclosure include compositions that include magnesium and gadolinium or magnesium and one or more metals.

19 Claims, No Drawings

(56) References Cited

FOREIGN PATENT DOCUMENTS

| EP | 2014319 | 1/2009 |
| EP | 2022443 | 2/2009 |
| EP | 2119414 | 11/2009 |
| EP | 2355108 | 10/2011 |
| JP | 08276117 A * | 10/1996 |
| WO | 1990006581 | 6/1990 |
| WO | 1998000258 | 1/1998 |
| WO | 2006096720 | 9/2006 |
| WO | 2011105685 | 9/2011 |

OTHER PUBLICATIONS

International Search Report and Written Opinion for Application No. PCT/US2011/042892, filed Jul. 2, 2011; dated Mar. 20, 2012 (9 pages).

Li Z et al, "The development of binary Mg—Ca alloys for use as biodegradable materials within bone" Biomaterials 2007; 29: (1329-1344).

Brar et al. "Investigation of the mechanical and degradation properties of Mg—Sr and Mg—Zn—Sr alloys for use as potential biodegradable implant materials." Journal of the Mechanical Behavior of Biomedical Materials 7 (2012) 87-95.

Brar et al. "A study of biodegradable Mg—3Sc—3Y alloy and the effect of surface passivation on in-vitro degradation" Acta Biomat\terialia 9 (2013) 5331-5340.

Chen et al, "The PANDAT Software Package and its Applications" CALPHAD 2002; 26: 175-188.

Berglund, et al.; Synthesis and Characterization of Mg—Ca—Sr Alloys for Biodegradable Orthopedic Implant Applications; Society for Biomaterials; Jun. 12, 2012; pp. 1524-1534.

International Search Report and Written Opinion for Application No. PCT/US2014/045364, filed Jul. 3, 2014; dated Oct. 28, 2014 (13 pages).

International Search Report and Written Opinion for Application No. PCT/US20141064065 filing date Nov. 5, 2014; dated Feb. 18, 2015 (7 pages).

Bornapour et al.; Biocompatibility and Biodegradability of Mg—Sr Alloys: The Formation of Sr-Substituted Hydroxyapatite; Acta Biomaterialia vol. 9 (2013), pp. 5319-5330.

Wan et al. "Preparation and characterization of a new biomedical magnesium-calcium alloy" Materials & Design 2008; 29:2034-2037.

International Search Report and Written Opinion for PCT application PCT/US16/13784; 7 Pages; Jun. 10, 2016.

Anyanwu et al. "Creep Properties of Mg—Gd—Y—Zr Alloys," Materials Transactions, vol. 42, No. 7 (2001) pp. 1212-1218.

He, S et al.; Comparison of the microstructure and mechanical properties of a ZK60 alloy with and without 1.3wt. % gadolinium addition; Article in Materials Science and Engineering A—Oct. 2006, 433:175-181.

* cited by examiner

RADIATION SHIELDING AND MITIGATING ALLOYS, METHODS OF MANUFACTURE THEREOF AND ARTICLES COMPRISING THE SAME

CROSS-REFERENCE TO RELATED APPLICATIONS

This application is a divisional application of U.S. Non-provisional patent application Ser. No. 15/654,817, filed Jul. 20, 2017, which is a continuation-in-part of PCT Application No. PCT/US2016/013784, filed Jan. 18, 2016, where the PCT claims priority to and the benefit of, U.S. Provisional Patent Application No. 62/106,975, filed Jan. 23, 2015, both of which are herein incorporated by reference in their entireties

BACKGROUND

Articles used in outer space interplanetary applications, extraterrestrial engineered systems, high altitude aerospace applications are subjected to high energy protons. These high energy protons interact with the articles producing neutron radiation that is harmful to living beings that occupy the article. It is therefore desirable to produce articles for these applications that can either absorb the neutrons, resist absorption of high energy protons, or accomplish both.

SUMMARY

In an aspect, the composition can include magnesium and other elements that result in alloys having advantageous properties, articles including one or more of the compositions, methods of making the compositions, methods of making the articles, and the like.

In an aspect, the present disclosure provides for a first composition comprising magnesium; where the magnesium is present in an amount of about 50 to 99.5 wt %; based on the total weight of the composition; and gadolinium. In an aspect, the present disclosure provides for an article including the first composition. For example, where one or more layers of the article include the first composition.

In an aspect, the present disclosure provides for a second composition comprising magnesium; where the magnesium is present in an amount of about 50 to 99.5 wt %; based on the total weight of the composition; and one or more metals; where the metals are aluminum, boron, manganese, scandium, lithium, yttrium, zinc, calcium or zirconium. In an embodiment, the second composition is devoid of gadolinium. In an aspect, the present disclosure provides for an article including the second composition. For example, where one or more layers of the article include the second composition. In an aspect, the article can include one layer that is made of the first composition and another layer that is made of the second composition.

In an aspect, the present disclosure provides for a method comprising molding a composition comprising magnesium and gadolinium; where the magnesium is present in an amount of about 50 to 99.5 wt %; based on the total weight of the composition.

In an aspect, the present disclosure provides for a method comprising molding a composition comprising magnesium; where the magnesium is present in an amount of about 50 to 99.5 wt %; based on the total weight of the composition; and one or more metals; where the metals are aluminum, boron, manganese, scandium, lithium, yttrium, zinc, calcium or zirconium. In an aspect, the composition is devoid of gadolinium.

DETAILED DESCRIPTION

In an aspect, the composition can include magnesium and other elements that result in alloys having advantageous properties, articles including one or more of the compositions, methods of making the compositions, methods of making the articles, and the like. Embodiments of the compositions include magnesium and where the composition is less likely (than existing aluminum, iron, and titanium-based metals) to interact with ultra-high-energy cosmic rays (UHECR) (e.g., high energy protons having a kinetic energy greater than $10^{18}$ eV), reducing the production of damaging additional neutrons or that can absorb the ultra-high-energy cosmic rays and also absorb any additional neutrons that are produced and/or absorb neutrons in low energy neutron environments such as near nuclear reactors. In an aspect, the composition can include magnesium and other elements that result in light weight alloys having structural integrity and high strength.

Embodiments of the compositions disclosed herein can have advantages relative to currently used materials. As the lightest structural metal, magnesium can contribute to weight savings over conventional steel, titanium, and aluminum alloys. The combination of these factors leads to a lightweight, neutron radiation resistant structural material. These compositions would be particularly well-suited to space missions outside of low earth orbit (LEO), where galactic cosmic rays (GCR) interact with spacecraft and produce a cascade of neutrons, high altitude commercial or military aviation, or extraterrestrial bodies. These neutrons, in turn, present a significant risk to the health of crew members and the reliability of sensitive electronic components. The disclosed compositions would significantly reduce the neutron dose to the interior of spacecraft.

In an aspect, compositions (also referred to herein as "first composition") can include magnesium and gadolinium, where the composition is used primarily to absorb low energy neutrons (also referred to herein as slow neutrons) that are generated from the irradiation of the high energy protons. This composition could also be used as shielding in other neutron environments, such as, but not limited to: upper atmosphere aerospace applications, nuclear reactors, nuclear warheads, electronics, and nuclear accident robotics.

In another aspect, compositions (also referred to herein as "second composition") can include magnesium and one or more other elements such as magnesium, aluminum, boron, manganese, scandium, lithium, yttrium, zinc, and zirconium, where this composition is devoid (e.g., includes 0%) of gadolinium. The second composition is used for reducing the absorption of ultra-high-energy cosmic rays (UHECR) (e.g., super high energy protons having a kinetic energy greater than $10^{18}$ eV), compared to existing structural materials like aluminum and titanium alloys and steels. Less interaction with UHECRs will result in lower levels of damaging secondary neutron production.

In one embodiment, the first composition contains magnesium and gadolinium. Magnesium is the lightest weight structural metal (i.e., a metal that has a high strength) and hence is used as the base material in the composition. The use of magnesium imparts structural integrity as well as light weight to the alloys. The magnesium can be about 50 to 99.5 weight percent (wt %), about 70 to 95 wt %, or about 75 to 90 wt %, based on the total weight of the first composition.

Gadolinium possesses the largest neutron absorption cross section of any element by nearly an order of magnitude, making it the most efficient element to use in a neutron shielding material. Reference to gadolinium (as well as any of the other elements described herein) includes the natural abundance of isotopes of the element. The natural abundance of gadolinium is Gd: [Gd-152 (0.2%), Gd-154 (2.2%), Gd-155 (14.8%), Gd-156 (20.5%), Gd-157 (15.7%), Gd-158 (24.9%), and Gd-160 (21.86%)]. In an aspect, the isotopes of each of the element (e.g., Gd) in the composition can be included in an amount higher than naturally present to enhance one or more characteristics of the alloy. For example, an isotope concentration can be used so as to include more of the isotope(s) having the highest neutron absorption. The isotope concentration can be synthetically altered by atomic separation or by using radioactive decay products. Any mixture of stable (or very long-lived) isotopes of any element will behave nearly identically via electronic interactions, (e.g. chemistry and metallurgy), but nuclear interactions can vary significantly (e.g. neutron absorption cross section, decay products). For example, isotope Gd-157 has the highest neutron absorption of the isotopes of gadolinium. In an aspect, the gadolinium present in the composition has a larger amount of Gd-157 present than is present in the natural abundance of gadolinium. Similarly, Gd-155 has a higher neutron absorption than the other isotopes of gadolinium except for Gd-157. For example, the amount of Gd-157 and/or Gd-155 present can be about 20% or more, about 40% or more, about 60% or more, about 80% or more, about 90% or more, or about 100% of the isotope composition of gadolinium. For example, if the amount of gadolinium is 20%, then of that 20%, the amount of Gd-157 (and/or Gd-155) can be 40%, with the remaining isotopes totaling 60%. The amount of gadolinium can be about 0.5 to 50 wt %, about 5 to 30 wt % or about 10 to 25 wt %, based on the total weight of the first composition.

The first composition may effectively be used to absorb thermal and slow neutrons, produced not exclusively by interaction of material with ultra-high-energy cosmic rays. The first composition may also be used in situations where it is desirable to generate very few high speed neutrons. In addition, magnesium alloys that contain substantial amounts of gadolinium produce highly refined and optimally oriented precipitates when heat treated. Additionally, as the lightest structural metal, Mg can contribute to weight savings over conventional steel, titanium, and aluminum alloys.

In an embodiment, the first composition can comprise one or more metals, where the metals are aluminum, boron, manganese, scandium, lithium, yttrium, zinc, calcium or zirconium. Reference to metals includes the natural abundance of isotopes of the metal. In an aspect, the isotopes of each of the element in the composition can be included in an amount higher than naturally present to have one or more desired characteristics. For example, the isotope concentration of a metal(s) can be designed so as to include more of the isotope(s) that reduce the absorption of ultra-high-energy cosmic rays (UHECR). The natural abundance of isotopes, by atomic percentage for these metal are: Mg: [Mg-24 (79.0%), Mg-25 (10.0%), Mg-26 (11.0%)], Al: [Al-27 (100%)], B: [B-10 (20%), B-11 (80%)], Mg: [Mn-55 (100%)], Sc: [Sc-45 (100%)], Li: [Li-6 (5%), Li-7 (95%)], Y: [Y-89 (100%)], Zn: [Zn-64 (49.2%), Zn-66 (27.7%), Zn-67 (4%), Zn-68 (18.5%), Zn-70 (0.6%)], Ca: [Ca-40 (96.9%), Ca-42 (0.65%), Ca-43 (0.14%), Ca-44 (2.1%), Ca-46 (0.004%)], and Zr: [Zr-90 (51.5%), Zr-91 (11.2%), Zr-92 (17.2%), Zr-94 (17.4%), Zr-96 (2.8%)]. The concentration can be synthetically altered by atomic separation or by using radioactive decay products. Any mixture of stable (or very long-lived) isotopes of any element will behave nearly identically via electronic interactions, (e.g. chemistry and metallurgy), but nuclear interactions can vary significantly (e.g. neutron absorption cross section, decay products). In this regard, one or more of the metals can be used to include the isotope(s) at higher percentages than the natural abundance to reduce the absorption of UHECR. In an aspect, the following isotopes reduce the absorption of UHECR and the metal isotope composition for each metal can include greater than the other isotopes of the metal: Mg-25, B-10, Li-6, Zn-67, Ca-43, Zr-91, and more specifically include B-10 and Li-6. For example, the amount of an isotope(s) of the metal present can be about 7% or more, about 10% or more, about 20% or more, about 40% or more, about 60% or more, about 80% or more, about 90% or more, about 92% or more, or about 100% of the desired isotope to reduce the absorption of UHECR.

In an aspect, the first composition may use aluminum in an amount of up to 40 wt %, boron in an amount of up to 50 wt %, manganese in an amount of up to 3 wt %, scandium in an amount of up to 30 wt %, lithium in an amount of up to 11 wt %, yttrium in an amount of up to 36 wt %, zinc in an amount of up to 50 wt %, calcium in an amount of up to 40 wt %, and zirconium in an amount of up to 4 wt %. All weight percents are based on the total weight of the first composition.

In an embodiment, the composition can comprise magnesium and gadolinium. In an embodiment, the composition can consist of magnesium and gadolinium. In an embodiment, the composition can consist essentially of magnesium and gadolinium. The phrases "consist essentially of" or "consisting essentially of" mean that trace amounts (e.g., less than about 1% of each contaminant or less than 0.1% of each contaminant) of contaminants can be present, where the contaminant(s) include those that may normally present in magnesium and gadolinium.

In an embodiment, the second composition may comprise magnesium and one or more metals, where the metals are aluminum, boron, manganese, scandium, lithium, yttrium, zinc, calcium or zirconium. The second composition may use aluminum in an amount of up to 40 wt %, boron in an amount of up to 50 wt %, manganese in an amount of up to 3 wt %, scandium in an amount of up to 30 wt %, lithium in an amount of up to 11 wt %, yttrium in an amount of up to 36 wt %, zinc in an amount of up to 50 wt %, calcium in an amount of up to 40 wt %, and zirconium in an amount of up to 4 wt %. All weight percents are based on the total weight of the second composition.

In an embodiment, the composition can comprise magnesium and one or more of aluminum, boron, manganese, scandium, lithium, yttrium, zinc, calcium or zirconium and is devoid of gadolinium. In an embodiment, the composition can consist of magnesium and one or more of aluminum, boron, manganese, scandium, lithium, yttrium, zinc, calcium or zirconium. In an embodiment, the composition can consist essentially of magnesium and one or more of aluminum, boron, manganese, scandium, lithium, yttrium, zinc, calcium or zirconium and is devoid of gadolinium. The phrases "consist essentially of" or "consisting essentially of" mean that trace amounts (e.g., less than about 1% of each contaminant or less than 0.1% of each contaminant) of contaminants can be present, where the contaminant(s) include those that may normally present in magnesium and aluminum, boron, manganese, scandium, lithium, yttrium, zinc, calcium and/or zirconium.

The second composition can include magnesium as a base metal and is devoid of gadolinium. The use of magnesium imparts structural integrity as well as light weight to the alloys. The amount of magnesium can be about 50 to 99.5 weight percent, about 70 to 97 wt %, or about 80 to 95 wt %, based on the total weight of the first composition.

The second composition can include one or more of aluminum, boron, manganese, scandium, lithium, yttrium, zinc, calcium and zirconium.

In an embodiment, the second composition can include aluminum in an amount of up to 40 wt %, about 0.5 to 5 wt % or about 1 to 3 wt %, based on the total weight of the composition.

In another embodiment, the second composition can include boron in an amount of up to 50 wt %, about 0.5 to 5 wt % or about 1 to 3 wt %, based on the total weight of the composition.

In yet another embodiment, the second composition can include manganese in an amount of up to 3 wt %, about 0.5 to 2 wt % or about 0.7 to 1.5 wt %, based on the total weight of the composition.

In yet another embodiment, the second composition can include scandium in an amount of up to 30 wt %, about 0.5 to 5 wt % or about 1 to 3 wt %, based on the total weight of the composition.

In yet another embodiment, the second composition can include lithium in an amount of up to 11 wt %, about 0.5 to 5 wt % or about 1 to 3 wt %, based on the total weight of the composition.

In yet another embodiment, the second composition can include yttrium in an amount of up to 36 wt %, about 0.5 to 5 wt % or about 1 to 3 wt %, based on the total weight of the composition.

In yet another embodiment, the second composition can include zinc in an amount of up to 50 wt %, about 0.5 to 5 wt % or about 1 to 3 wt %, based on the total weight of the composition.

In yet another embodiment, the second composition can include calcium in an amount of up to 40 wt %, about 0.5 to 5 wt % or about 1 to 3 wt %, based on the total weight of the composition.

In yet another embodiment, the second composition can include zirconium in an amount of up to 4 wt %, about 0.5 to 2 wt % or about 0.7 to 1.5 wt %, based on the total weight of the composition.

In an aspect, any combination of aluminum, boron, manganese, scandium, lithium, yttrium, zinc, calcium and zirconium in the any of the amounts stated above can also be used in conjunction with magnesium in any amounts stated above.

The first and second compositions both display advantages over current materials. They are light weight and are structurally strong and versatile. They can be used for shielding in nuclear reactors, aerospace vehicles, and spacecraft. The spacecraft may be used on space missions outside of low earth orbit.

In one method of manufacturing the first composition or the second composition, the ingredients can be mixed together following which they are melted and poured into a mold. The mold is cooled and the molded object removed. The molded object may be used "as-is" or it may be subjected to additional finishing processes such as grinding, welding, polishing, adhesion, extrusion, or rolling to form articles for commercial use.

In another method of manufacturing the molded object may be ground into a powder and re-cast or sintered to form the article. The article may be subjected to the finishing processes listed above to form a commercial article.

In yet another method of manufacturing, the ingredients in powder (prior to molding) form may be sintered under pressure together to form an article. The article may be subjected to the finishing processes listed above to form a commercial article.

In one embodiment, the first composition and the second composition may be used in a multilayered article. For example, the first composition may be used in a first layer while the second composition is used in a second layer that is disposed parallel to the first layer. In an aspect, the layer of the first composition alternates with the layer of the second composition. In one embodiment, the first layer and the second layer are in direct contact with each other. In an aspect, the number of layers can be about 2 to 10,000. In an aspect, the thickness of each layer can be about 0.01 mm to 100 cm.

It is to be noted that all ranges detailed herein include the endpoints. Numerical values from different ranges are combinable.

The term "and/or" includes both "and" as well as "or". For example, "A and/or B" is interpreted to be A, B, or A and B.

While the aspects has been described with reference to some embodiments, it will be understood by those skilled in the art that various changes may be made and equivalents may be substituted for elements thereof without departing from the scope of the present disclosure. In addition, many modifications may be made to adapt a particular situation or material to the teachings of the invention without departing from essential scope thereof. Therefore, it is intended that the present disclosure not be limited to the particular embodiments disclosed as the best mode contemplated for carrying out embodiments of the present disclosure, but that the invention will include all embodiments falling within the scope of the appended claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

The invention claimed is:

1. A first composition comprising:
   magnesium; where the magnesium is present in an amount of about 50 wt % to 99.5 wt %; based on the total weight of the composition; and
   gadolinium, wherein the gadolinium includes the isotope Gd-157, Gd-155, or both in an amount greater than the natural abundance of Gd-157, Gd-155, or both naturally present in gadolinium, and wherein the amount of isotope Gd-157, Gd-155, or both in the gadolinium is greater than 40% of the total amount isotopes present in gadolinium.

2. The composition of claim 1, wherein the amount of magnesium is from about 70 wt % to about 95 wt %.

3. The composition of claim 1, wherein the amount of isotope Gd-157, Gd-155, or both in the gadolinium is greater than 40% to about 100% of the total amount isotopes present in gadolinium.

4. The composition of claim 1, wherein the amount of gadolinium is from about 0.5 wt % to about 50 wt %.

5. The composition of claim 1, wherein the amount of gadolinium is from about 5 wt % to about 30 wt %.

6. The composition of claim 1, where the first composition further comprises one or more metals, where the metals are aluminum, boron, manganese, scandium, lithium, yttrium, zinc, calcium or zirconium.

7. The composition of claim 1, wherein the composition includes one or more isotopes selected from the following: Mg-25, B-10, Li-6, Zn-67, Ca-43, and Zr-91.

8. The composition of claim 1, wherein the amount of magnesium is from about 70 wt % to about 95 wt % and the amount of gadolinium is from about 5 wt % to about 30 wt %.

9. An article comprising the composition of claim 1.

10. The article of claim 9, where the article comprises multiple layers.

11. The article of claim 9, wherein the article comprises two layers, wherein each layer comprises a different composition of claim 1.

12. An article comprising two layers, the first layer comprises the composition of claim one and the second layer comprises a composition of magnesium in an amount of about 50 wt % to 99.5 wt % based on the total weight of the composition and gadolinium.

13. A first composition comprising:
 magnesium in an amount of about 50 wt % to 99.5 wt %; based on the total weight of the composition;
 gadolinium; and
 one or more isotopes selected from the following: Mg-25, B-10, Li-6, Zn-67, Ca-43, and Zr-91, wherein the amount of the isotope is greater than the natural abundance of the same isotope in naturally-occurring magnesium, boron, lithium, zinc, calcium, or zirconium.

14. The composition of claim 13, wherein the amount of magnesium is from about 70 wt % to about 95 wt %.

15. The composition of claim 13, wherein the amount of gadolinium is from about 0.5 wt % to about 50 wt %.

16. An article comprising the composition of claim 13.

17. The composition of claim 13, wherein the amount of gadolinium includes an amount of the isotope Gd-157, Gd-155, or both in an amount greater than the natural abundance of Gd-157, Gd-155, or both naturally present in gadolinium.

18. The composition of claim 17, wherein the amount of isotope Gd-157, Gd-155, or both in the gadolinium is greater than 40% of the total amount isotopes present in gadolinium.

19. The composition of claim 17, wherein the amount of isotope Gd-157, Gd-155, or both in the gadolinium is greater than 40% to about 100% of the total amount isotopes present in gadolinium.

* * * * *